(12) United States Patent
Sowder

(10) Patent No.: US 8,935,922 B2
(45) Date of Patent: Jan. 20, 2015

(54) STEAM GENERATION DEVICE

(76) Inventor: Joseph T Sowder, Indian Springs, AL (US)

( * ) Notice: Subject to any disclaimer, the term of this patent is extended or adjusted under 35 U.S.C. 154(b) by 892 days.

(21) Appl. No.: 13/014,983

(22) Filed: Jan. 27, 2011

(65) Prior Publication Data

US 2012/0192562 A1    Aug. 2, 2012

(51) Int. Cl.
F03G 6/00   (2006.01)
F03G 7/00   (2006.01)
F03G 6/06   (2006.01)
C02F 1/14   (2006.01)
C02F 103/08 (2006.01)

(52) U.S. Cl.
CPC . *F03G 6/065* (2013.01); *C02F 1/14* (2013.01); *Y02E 10/46* (2013.01); *C02F 2103/08* (2013.01)
USPC ........................ 60/641.9; 60/641.15

(58) Field of Classification Search
USPC .............. 60/641.8–641.15, 645–681
See application file for complete search history.

(56) References Cited

U.S. PATENT DOCUMENTS

| | | | |
|---|---|---|---|
| 2,902,028 A | 9/1959 | Manley | |
| 3,928,145 A * | 12/1975 | Othmer | 203/11 |
| 4,078,975 A * | 3/1978 | Spears, Jr. | 203/10 |
| 4,078,976 A * | 3/1978 | Spears, Jr. | 203/10 |
| 4,121,977 A * | 10/1978 | Carson | 203/11 |
| 4,134,393 A | 1/1979 | Stark et al. | |
| 4,213,303 A * | 7/1980 | Lane | 60/641.15 |
| 4,253,307 A | 3/1981 | Smith | |
| 4,270,981 A | 6/1981 | Stark | |
| 4,302,682 A * | 11/1981 | LaCoste | 290/1 R |
| 4,707,990 A | 11/1987 | Meijer | |
| 6,895,145 B2 | 5/2005 | Ho | |
| 6,899,075 B2 * | 5/2005 | Saint-Hilaire et al. | 123/241 |
| 2008/0083604 A1 | 4/2008 | Al-Garni et al. | |

FOREIGN PATENT DOCUMENTS

| | | |
|---|---|---|
| CN | 1865807 | 11/2006 |
| CN | 201000226 | 1/2008 |
| CN | 101555043 | 10/2009 |

* cited by examiner

*Primary Examiner* — Christopher Jetton
(74) *Attorney, Agent, or Firm* — James Ray & Assoc.

(57) ABSTRACT

The present invention in several embodiments is an apparatus for producing potable distilled water and solar-thermal energy, as co-products of the generation of steam from sea water by concentrated solar radiation. This apparatus would be comprised of an array an Fresnel lenses of the same or substantially the same focal length which preferably each have an area of approximately 1 square meter, which are oriented in the appropriate 3-dimensional plane in relation to the sun to collect the maximum amount of solar energy over the area of the lens; the lens array would follow or "track" the sun across the horizon in two dimensions. The lens array would focus the collected and concentrated solar radiation in one discrete area of a boiling of several square centimeters, in order to produce steam which is then used to create power and is condensed to provide distilled water.

18 Claims, 4 Drawing Sheets

STEAM GENERATION DEVICE

FIELD OF THE INVENTION

The present invention relates, in general, to steam generation for power generation and distilling water and, more particularly, this invention relates to a solar powered apparatus that uses at least one lens to focus sunlight onto a boiling vessel.

BACKGROUND OF THE INVENTION

Prior to the conception and development of the present invention, solar power generation devices, as are generally well known in the prior art, have been used to produce distilled water, and usable energy. However modular and scalable systems of this type capable of being used either by a single home or by a large city have not been successfully practiced. U.S. Pat. Nos. 2,902,028; 4,134,393; 4,253,307; 4,270,981; 4,707,990 and 6,895,145 disclose varies systems and apparatuses for producing steam, distilled water and energy, and hereby incorporated by reference.

SUMMARY OF THE INVENTION

The present invention in several embodiments is an apparatus for producing potable distilled water and solar-thermal energy, as co-products of the generation of steam from sea water by concentrated solar radiation. This apparatus would be comprised of an array of one (or several) Fresnel lens(es) of the same or substantially the same focal length which preferably each have an area of approximately 1 square meter, which are oriented in the appropriate 3-dimensional plane in relation to the sun to collect the maximum amount of solar energy over the area of the lens; the lens array would follow or "track" the sun across the horizon in two dimensions via a small solar-powered motorized device, in order to continually maximize the incident light falling on the lens(es). The device holding the lens(es) in the proper orientation would preferably be made of cast aluminum or a similar strong, lightweight, durable material. The lens array would focus the collected and 'concentrated' solar radiation in one discrete area of several square centimeters, by virtue of the focal point of the positive Fresnel lens(es), in order to produce extremely high temperature thermal energy (>1000 deg C.).

The concentrated thermal energy is then transferred, or applied, to a 'boiler' vessel containing the sea water to be distilled. The lens array may move in an arc around the 'boiler vessel', with a radius which is the same as the focal length of the lens, in order to continually focus the concentrated solar radiation in the same place on the boiler vessel. The 'boiler vessel' would need to be capable of holding, under increased pressure and temperature, a constant quantity of sea water which is supplied to the boiler in a constant stream from the ocean, either directly or indirectly, sufficient to produce a constant out-flow of steam at a temperature and pressure high enough to produce enough force to power a steam quasiturbine coupled to a generator, a steam-turbine generator, a steam-turbine which incorporates a generator, or possibly a Stirling engine coupled to a generator. The subsequent electrical current (energy) produced either AC or DC, can be harvested for immediate use or stored in the form of a battery bank. The steam exiting from the turbine or engine would then be diverted to a condenser for collection of the resultant condensed distilled water, thus co-producing solar-thermal energy and potable distilled water at the same time. The resultant condensate (distilled water) that exits from the turbine or engine as steam, would require a separator in order to remove the steam-engine oil which is required by the engine for lubrication. Currently, in a preferred embodiment, it is envisioned that the 'boiler vessel' would provide high temperature steam to a 'flash steam vessel', in order to provide lower pressure flash steam to a quasiturbine engine, which can be driven at a lower psi requirement, and also recover the distilled water in one step, instead of after the steam has passed through the turbine. This would also obviate the need for a separator, as there would be no lubricant added to the steam that is collected, as would be the case if the steam is first passed through the turbine. The quasiturbine itself could be used as a 'flash steam vessel' in another preferred embodiment. Several quasiturbines are described in U.S. Pat. Nos. 6,899,075 and 6,164,263; and are hereby incorporated by reference.

For all practical purposes, there is an endless supply of sea water in coastal or island communities, and there is no need to collect the distilled water for re-use in the generation of the steam; because this apparatus does not require recirculation of the water or steam, there is no need for elaborate recirculation tubing and valves. The sea water which is input to the system would be pre-filtered or otherwise clarified prior to its entry into the 'boiler vessel', to decrease the amount of sediment or sludge or scale which results from the distillation process. It is envisioned that the 'boiler vessel' could be cleaned and reused, or possibly simply replaced. If desired, the condenser could be designed so that the heat normally lost to the environment in the condensation of the steam could be used to pre-heat the sea water before its conversion to steam in the 'boiler vessel'. It would also be possible to produce "superheated steam" with this system since it is possible to generate such high temperatures.

Because of the inherent orientation of the lens(es) focusing the light downward, the whole apparatus could be built on the ground, and there would be no need for a giant tower to collect the thermal radiation as in some solar energy set-ups, which would make it much more practical, particularly on a small scale for individual households. The present invention also does not have a need for the use of expensive and inefficient photovoltaic cells, with the exception of in the tracking device. However the tracking device could be powered by many other means. It would be preferable for the apparatus to be self-contained and of a predetermined size, which would be sufficient to provide all, or most, of the power and potable water for a single household. It would logically follow that essentially any water in any environment can be distilled to potable water by this method. It also follows that a number of smaller units could be combined to produce a larger quantity of water and energy. It is also envisioned that this technique could be applied to a much larger scale to produce electrical energy and distilled (potable) water for a significantly larger population. The potential limitations would only be the size of the Fresnel lenses currently available, the space for the apparatus, the availability of an appropriate boiler vessel and the proper exposure to sunlight throughout the day.

OBJECTS OF THE INVENTION

It is, therefore, one of the primary objects of the present invention is to provide a solar apparatus capable of producing steam for power generation and distillation.

Another object of the present invention is to provide a solar powered system for producing distilled water and electrical energy.

Still another object of the present invention is to provide a solar energy collector comprising; at least one Fresnel lens; a boiling vessel in fluid connection with a first inlet water pipe and in fluid connection with a first outlet water pipe, a controllable means for directing the sun's rays towards said at least one Fresnel lens to generate heat, to boil water in said boiling vessel, a flash steam vessel in fluid connection with said first outlet water pipe, a power generation means coupled to an outlet of said flash steam vessel, and a steam condenser means connected to an outlet from said power generation means for substantially simultaneously dissipating residual heat in said steam effluent from said primary turbine and for condensing said steam to substantially pure water. In another embodiment said controllable means for directing the sun's rays comprises at least one elongated support connected to a rotatable post. In still another embodiment said power generation means comprises a quasiturbine. In yet still another embodiment said power generation means comprises a quasiturbine mechanically coupled to at least one generator. In yet another embodiment the invention further comprising a reservoir connected to an outlet from said steam condenser means. In another embodiment said at least one Fresnel lens comprises at least three Fresnel lenses. In another embodiment said at least one Fresnel lens comprises at least nine Fresnel lenses. In another embodiment said steam condenser means includes a radiator connected to said primary turbine for simultaneously recovering useful heat from said steam and for partially condensing said steam to water, and a condenser connected to said radiator for substantially completely condensing said steam to water. In another embodiment said steam condenser means includes a radiator connected to said power generation means for simultaneously recovering useful heat from said steam and for partially condensing said steam to water, and a condenser connected to said radiator for substantially completely condensing said steam to water. In another embodiment said steam condenser means includes a means for transferring heat to said first inlet water pipe for preheating the water within said first inlet water pipe.

In another embodiment the invention is a solar energy collector comprising; at least one Fresnel lens; a boiling vessel in fluid connection with a first inlet water pipe and in fluid connection with a first outlet water pipe, a controllable means for directing the sun's rays towards said at least one Fresnel lens to generate heat, to boil water in said boiling vessel, a flash steam vessel in fluid connection with said first outlet water pipe, a quasiturbine coupled to an outlet of said flash steam vessel, and a steam condenser means connected to an outlet from said power generation means for substantially simultaneously dissipating residual heat in said steam effluent from said primary turbine and for condensing said steam to substantially pure water. In yet another embodiment said steam condenser means includes a radiator connected to said quasiturbine for simultaneously recovering useful heat from said steam and for partially condensing said steam to water, and a condenser connected to said radiator for substantially completely condensing said steam to water. In another embodiment said steam condenser means includes a means for transferring heat to said first inlet water pipe for preheating the water within said first inlet water pipe. In yet another embodiment the invention further comprises a reservoir connected to an outlet from said steam condenser means. In still another embodiment said at least one Fresnel lens comprises at least three Fresnel lenses. In yet still another embodiment said at least one Fresnel lens comprises at least nine Fresnel lenses.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
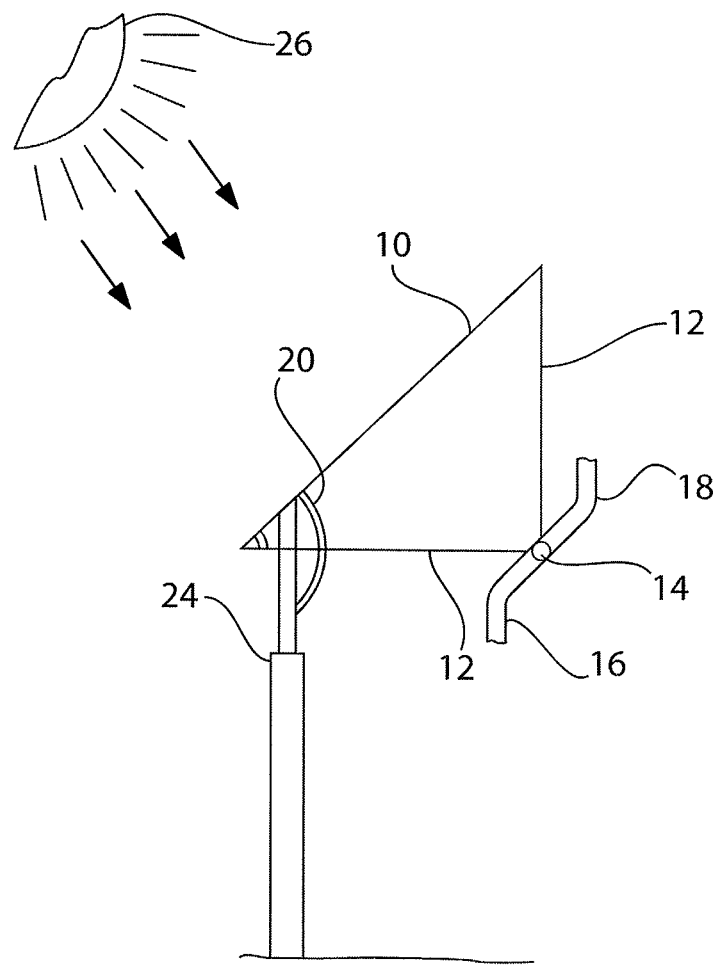
FIG. 1 shows a schematic side view of a preferred embodiment of the present invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-4.

FIG. 1 shows a schematic side view of a preferred embodiment of the present invention. The present invention preferably comprises a lens 10, support struts 12, boiling vessel 14, input pipe 16, output pipe 18, hinge 20, and rotating post 24. Preferably hinge 20 is a gas shock hinge. Preferably hinge 20 and rotating post 24 are used with or comprise part of a heliostat system. The heliostat system moves the lens 10 so that it is at an optimal position in regards to the Sun 26.

Boiling vessel 14 is in fluid connection with input pipe 16 and output pipe 18. Fluid entering the boiling vessel 14 from said input pipe 16 may be in a liquid phase and may leave the boiling vessel 14 via output pipe 18 in a gas phase.

Figure 2:
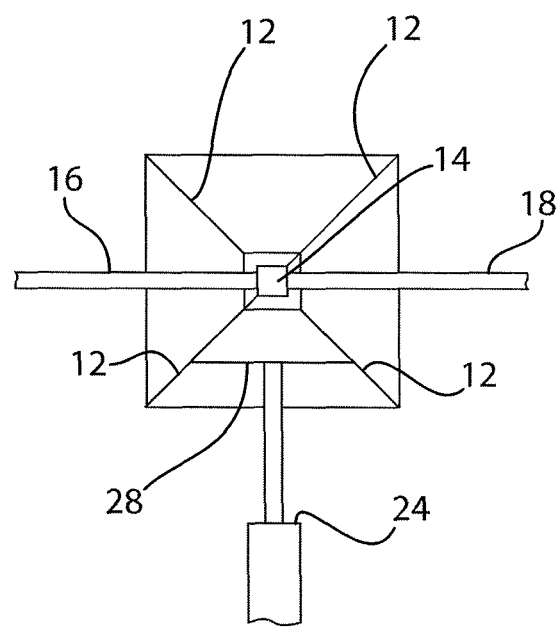
FIG. 2 shows a rear schematic view of the present invention.
Figure 3:
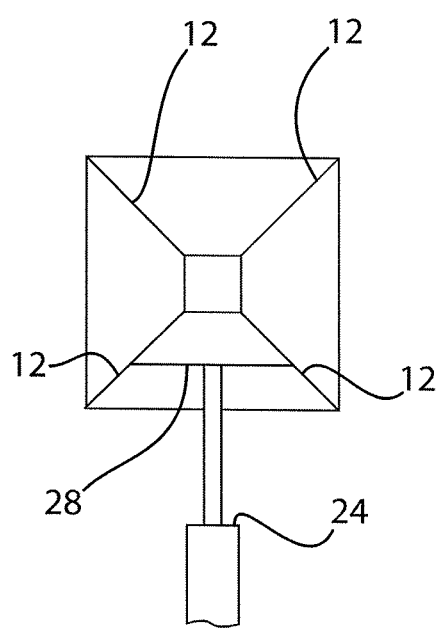
FIG. 3 is another view of the apparatus without boiling vessel 14 and the connecting pipes.

FIG. 2 shows a rear schematic view of the present invention. It should be noted that T support strut 28 is not visible in FIG. 1. FIG. 3 gives another view of the apparatus without boiling vessel 14 and the connecting pipes.

Figure 4:
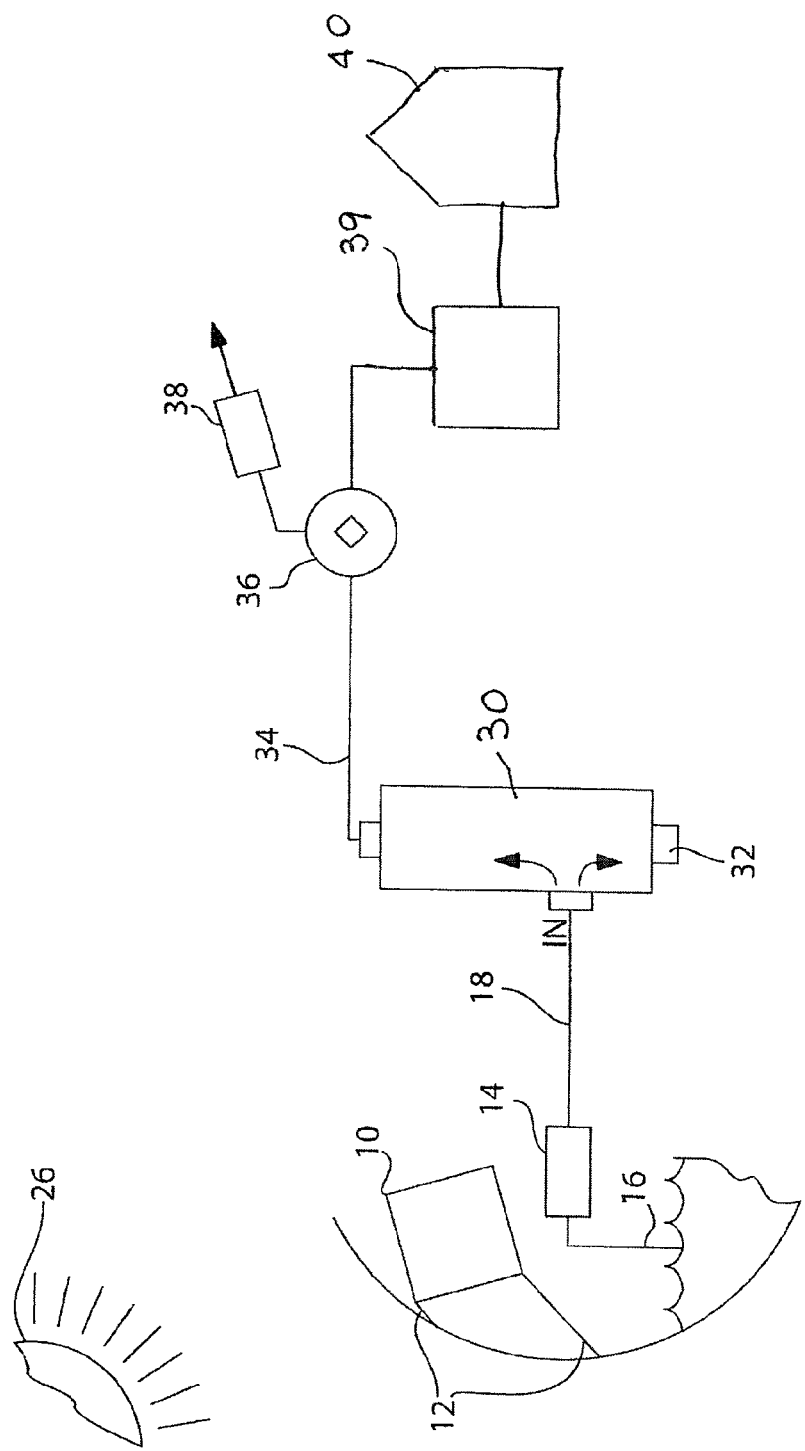
FIG. 4 shows a schematic overview of a preferred embodiment of a system comprising the present invention.

FIG. 4 shows a schematic overview of a preferred embodiment of a system comprising the present invention. Lens 12, which is preferably a Fresnel lens, focuses rays from sun 26 onto boiling vessel 14. Boiling vessel 14 heats water which enters said boiling vessel via input pipe 16 and outputs steam to output pipe 18. Preferably output pipe 18 injects steam into a flash steam vessel 30 which outputs distilled water out of a first output 32 and outputs steam out of a second output 34. Second output 34 transfers steam to a quasi-turbine 36 which is mechanically connected to a generator 38 for power generation. Steam from said quasi-turbine 36 is then transferred to a condenser 40 through an optional radiator 39, for the collection of distilled water. Quasi-turbine could be a turbine. Also, said condenser 40 could be another apparatus for collecting water from steam.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A solar powered apparatus for generating power and for distilling water in a recirculation free manner, comprising;
   a. a boiling vessel in a fluid connection with an inlet water pipe and in a fluid connection with an outlet water pipe, said inlet water pipe in a contact with a body of a fresh water,
   b. at least one Fresnel lens mounted between said boiling vessel and a solar radiation and operable to generate thermal energy in a response to the solar radiation and transfer said thermal energy to said boiling vessel, said transferred thermal energy sufficient to heat the fresh water entering said boiling vessel through said inlet water pipe,
   c. a controllable means for moving said at least one Fresnel lens and for directing the solar radiation towards said at least one Fresnel lens,
   d. a flash steam vessel in a direct fluid connection with said outlet water pipe, said flash steam vessel outputs a distilled water through a first outlet thereof and outputs steam through a second outlet thereof,
   e. a power generation means coupled to said second outlet of said flash steam vessel, and
   f. a steam condenser means connected to an outlet from said power generation means for substantially simultaneously dissipating a residual heat in a steam effluent from said power generation means and for condensing said steam effluent to a substantially pure water.

2. The solar powered apparatus according to claim 1, wherein said controllable means for directing the sun's rays comprises at least one elongated support connected to a rotatable post.

3. The solar powered apparatus according to claim 1, wherein said power generation means comprises a quasiturbine.

4. The solar powered apparatus according to claim 1, wherein said power generation means comprises a quasiturbine mechanically coupled to at least one generator.

5. The solar powered apparatus according to claim 1, further comprising a reservoir connected to an outlet from said steam condenser means.

6. The solar powered apparatus according to claim 1, wherein said at least one Fresnel lens comprises at least three Fresnel lenses.

7. The solar powered apparatus according to claim 1, wherein said at least one Fresnel lens comprises at least nine Fresnel lenses.

8. The solar powered apparatus according to claim 1, wherein said steam condenser means includes a radiator connected to said power generation means for simultaneously recovering useful heat from said steam and for partially condensing said steam to water.

9. The solar powered apparatus according to claim 1, wherein said steam condenser means includes a radiator connected to said power generation means for simultaneously recovering useful heat from said steam and for partially condensing said steam to water, and a condenser connected to said radiator for substantially completely condensing said steam to water.

10. A solar powered apparatus for generating power and for distilling water in a recirculation free manner, comprising:
    a. at least one Fresnel lens;
    b. a boiling vessel in a fluid connection with an inlet water pipe and in fluid connection with an outlet water pipe, said inlet water pipe in a direct contact with a body of a fresh sea water,
    c. a controllable means for directing the sun's rays towards said at least one Fresnel lens to generate heat, to boil water in said boiling vessel, wherein said at least one Fresnel lens moves in an arc manner about said boiling vessel,
    d. a flash steam vessel in a direct fluid connection with said outlet water pipe,
    e. a quasiturbine coupled to an outlet of said flash steam vessel, and
    f. a steam condenser connected to an outlet from said quasiturbine for substantially simultaneously dissipating a residual heat in said steam effluent from said quasiturbine and for condensing said steam effluent to a substantially pure water.

11. A solar powered apparatus according to claim 10, wherein said steam condenser includes a radiator connected to said quasiturbine for simultaneously recovering useful heat from said steam and for partially condensing said steam to water, and a condenser connected to said radiator for substantially completely condensing said steam to said substantially pure water.

12. The solar powered apparatus according to claim 10, further comprising a reservoir connected to an outlet from said steam condenser.

13. The solar powered apparatus according to claim 10, wherein said at least one Fresnel lens comprises at least three Fresnel lenses.

14. The solar powered apparatus according to claim 10, wherein said at least one Fresnel lens comprises at least nine Fresnel lenses.

15. The solar powered apparatus of claim 1, wherein a radius of said arc is equal to a focal length of said at least one Fresnel lens.

16. The solar powered apparatus of claim 2, wherein said at least one elongated support is an arrangement of support struts having said at least one Fresnel lens attached at an inclined thereto and a hinge connected to said rotatable post.

17. A power generation and water distilling apparatus comprising;
    a. a boiling vessel in a fluid connection with an inlet water pipe and in a fluid connection with an outlet water pipe;
    b. at least one Fresnel lens attached, at an incline, to an arrangement of support struts and being positioned between said boiling vessel and a source of a solar radiation;
    c. a rotating post mounted in a vertical direction and having an upper end thereof attached with a hinge to said at least one Fresnel lens, said rotating post and said hinge operable to move said at least one Fresnel lens and said arrangement of support struts in an arc manner around said boiling vessel and for directing the solar radiation towards said at least one Fresnel lens so that said at least one Fresnel lens generates a thermal energy in a response to said solar radiation and transfers said thermal energy to said boiling vessel, said transferred thermal energy sufficient to heat water entering said boiling vessel through said first inlet water pipe, wherein a radius of said arc is equal to a focal length of said at least one Fresnel lens;
    d. a flash steam vessel in a direct fluid connection with said outlet water pipe, said flash steam vessel outputs a potable distilled water through a first outlet thereof and outputs steam through a second outlet thereof;
    e. a quasiturbine coupled to said second outlet of said flash steam vessel; and
    f. a steam condenser connected to an outlet from said quasiturbine, said steam condenser dissipating a residual heat in a steam effluent from said primary turbine and condensing said steam effluent to a substantially pure water.

18. The power generation and water distilling apparatus of claim 17, configured to operate in a recirculation-free manner.

\* \* \* \* \*